Aug. 22, 1961 — M. P. HANSON — 2,997,274
TURBO-MACHINE BLADE VIBRATION DAMPER
Filed April 13, 1953

INVENTOR
Morgan P. Hanson
BY
ATTORNEYS

United States Patent Office 2,997,274
Patented Aug. 22, 1961

2,997,274
TURBO-MACHINE BLADE VIBRATION DAMPER
Morgan P. Hanson, Cuyahoga, Ohio, assignor to the United States of America as represented by the Secretary of the Navy
Filed Apr. 13, 1953, Ser. No. 348,600
1 Claim. (Cl. 253—77)
(Granted under Title 35, U.S. Code (1952), sec. 266)

This invention relates to turbo-machine blade vibration damping devices.

Vibration in the blades of the rotor of a turbo-machine, or a gas turbine, is a factor which has been the object of considerable remedial attempts. Its harmful effects in turbo-machines are well known, and an object of this invention is to reduce blade vibration amplitude by inducing damping into the blading of a turbo-machine.

A more specific object of the invention is to induce damping into the blade system of a turbo-machine to reduce the vibration amplitude by providing one or more pins that fit into openings in the machine rotor and contact and bear against the blade shanks or appendages fixed thereto, with a continuous centrifugal force whereby in the event of incipient blade vibration, the bending of the blade produces relative motion between the blade shank (or appendage) and the pin or pins and the rotor. The combined effect produces frictional forces tending to dampen any destructive vibration.

Other objects will become apparent in following the description of the illustrated forms of the invention.

Figure 1:
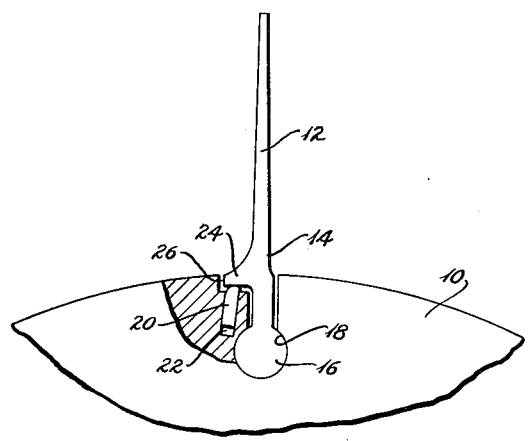
FIG. 1 is a fragmentary elevational view, with parts broken away, of a turbo-machine rotor and one blade provided with the damping means.

In FIG. 1 there is a turbo-machine rotor disc 10 provided with blade 12 that is one of a group normally found in a typical turbine or compressor rotor. The blade has a shank 14, at the inner end of which there is the blade anchor or base 16 fitted in the rotor disc peripheral socket 18. The means to induce damping into the blade system consist of a pin 20 loosely fitted for free axial movement in a generally radial recess 22 in the rotor, the pin contacting a lateral appendage 24 extending from blade shank 14. Relieved portion defining recess 26 in the rotor disc surface accommodates the appendage 24.

Figure 2:
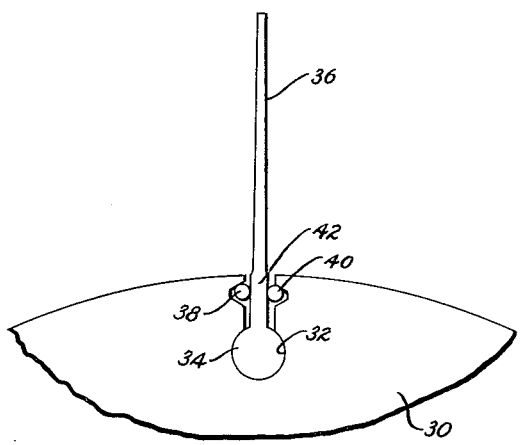
FIG. 2 is a fragmentary elevational view of another turbo-machine rotor and blade provided with a modified form of vibration damping means.

In FIG. 2 the rotor disc 30 has blade socket 32 in which the blade anchor or base 34 is fitted, blade 36 extending through the rotor disc periphery in the usual manner. Vibration damping means in this instance consist of pins 38 and 40, one on each side of blade shank 42, and each disposed in its recess in rotor disc 30. The pin recesses open toward or face the blade shank 42 and each has a sloping outer wall that acts as a cam in the operation of the damping means.

In operation of the embodiment of FIG. 1, rotor disc 10 is brought up to speed during which period centrifugal force acting on pin 20 and in a direction generally parallel to its longitudinal axis, urges the pin outwardly of the rotor and against appendage 24 fixed to shank 14. Regardless of how close machining tolerances are kept, and clearances between blade shank 14 and rotor disc 10 are exaggerated, the pin 20 will exert a continuous, calculatable force against appendage 24 and in the event of vibration, the bending of blade 12 causes relative motion between the appendage 24, pin 20 and rotor disc 10. The frictional forces set up by this relative motion have a reaction at the blade shank 14 in the vicinity of appendage 24 and this tends to dampen any destructive vibration by reducing vibration amplitude.

In the embodiment of FIG. 2, the pins 38 and 40 have the centrifugal force generated upon rotor actuation, applied transversely of their respective longitudinal axes. The pins are urged against the sloped outer recess walls whereby the resulting cam action directs the pins against the shank 42 with a continuous, calculatable force. The damping results from the combined effects of pins 38 and 40 setting up frictional resistance between shank 42 and the walls of the pin recesses, which frictional resistance to relative movement has a reaction applied to blade shank 42 for reducing blade vibration amplitude.

Obviously many modifications and variations of the present invention are possible in the light of the above teachings. It is therefore to be understood that within the scope of the appended claim the invention may be practiced otherwise than as specifically described.

The invention described herein may be manufactured and used by or for the Government of the United States of America for governmental purposes without the payment of any royalties thereon or therefor.

What is claimed is:

In a machine rotor, a rotatable disc having a peripheral blade base socket and a recess separate from but adjacent said socket, a single blade provided with a shank and with a base placed in said socket, a pin positioned in said recess, said blade having its shank adjacent said recess, said recess being approximately radially disposed with respect to the axis of the disc, an appendage protruding laterally from the blade shank, and said pin being freely movable in said recess subject to centrifugal forces when said disc is rotated with a portion thereof adapted to contact said appendage to transmit force from the pin to the shank of the blade whereby on disc rotation said pin is forced outwardly into engagment with said appendage to reduce the vibrational amplitude of said blade shank.

References Cited in the file of this patent

UNITED STATES PATENTS

| | | |
|---|---|---|
| 1,833,754 | Paget | Nov. 24, 1931 |
| 1,856,786 | Rice | May 3, 1932 |
| 2,349,187 | Meyer | May 16, 1944 |
| 2,618,460 | Williams | Nov. 18, 1952 |
| 2,651,494 | Persson | Sept. 8, 1953 |
| 2,669,383 | Purvis | Feb. 16, 1954 |
| 2,783,023 | Stalker | Feb. 26, 1957 |

FOREIGN PATENTS

| | | |
|---|---|---|
| 168,997 | Great Britain | Sept. 12, 1921 |
| 670,665 | Great Britain | Apr. 23, 1952 |

OTHER REFERENCES

S.A.E. Journal, February, 1948. Pages 32–34.